United States Patent

Nygård et al.

[19]

[11] Patent Number: 6,044,082
[45] Date of Patent: Mar. 28, 2000

[54] PRIVATE BRANCH EXCHANGE, TELECOMMUNICATION SYSTEM AND METHODS OF TRANSMITTING SIGNALS IN SUBRATE CHANNELS

[75] Inventors: Tommy Nygård, Stockholm; Leif Isaksson, Tyresö; Knut-Olof Jönsson, Nacka; Stefan Hörnqvist, Dalarö; Johan Widman, Älvsjö; Johan Pettersson, Bromma, all of Sweden

[73] Assignee: Telefonaktiebolaget LM Ericsson, Stockholm, Sweden

[21] Appl. No.: 08/935,083

[22] Filed: Sep. 26, 1997

[30] Foreign Application Priority Data

Oct. 1, 1996 [SE] Sweden ................................. 9603590

[51] Int. Cl.⁷ ................................. H04J 3/16; H04J 3/22; H04L 12/43
[52] U.S. Cl. ...................... 370/437; 370/468; 370/458; 370/538
[58] Field of Search ..................... 370/477, 468, 370/458, 431, 437, 537, 538

[56] References Cited

U.S. PATENT DOCUMENTS

| | | | |
|---|---|---|---|
| 4,519,073 | 5/1985 | Berttocci et al. | 370/477 |
| 4,782,485 | 11/1988 | Gollub | 370/477 |
| 4,903,261 | 2/1990 | Baran et al. | 370/396 |
| 4,965,787 | 10/1990 | Almond et al. | 370/466 |
| 5,301,190 | 4/1994 | Tsukuda et al. | 370/362 |
| 5,467,353 | 11/1995 | Fukuda | 370/524 |
| 5,546,395 | 8/1996 | Sharma et al. | 370/468 |
| 5,555,541 | 9/1996 | Yazawa et al. | 370/385 |

FOREIGN PATENT DOCUMENTS

0705052A2 4/1996 European Pat. Off. .
93/16568 8/1993 WIPO .
97/24903 7/1997 WIPO .

OTHER PUBLICATIONS

ITU–T Recommendation 1.460, Integrated Services Digital Network (ISDN), ISDN User–Network Interfaces, "Multiplexing, Rate Adaption and Support of Existing Interfaces", 1993, pp. 1–3.
ITU–T Recommendation V.110, Series V: Data Communication Over the Telephone Network, Interworking With Other Networks, "Support by an ISDN of Data Terminal Equipments with V–Series Type Interfaces", 1996, pp. 1–55.
CCITT Recommendation G.728, General Aspects of Digital Transmission Systems; Terminal Equipments, "Coding of Speech at 16 kbit/s Using Low–Delay Code Excited Linear Prediction", 1992, pp. 1–25.

*Primary Examiner*—Hassan Kizou
*Assistant Examiner*—John Pezzlo
*Attorney, Agent, or Firm*—Burns, Doane, Swecker & Mathis, L.L.P.

[57] ABSTRACT

The present invention relates to a private branch exchange, a telecommunication system comprising such an exchange and methods of transmitting signals in subrate channels of a fullrate channel. The exchange comprises a switch control means, which allocates subrate traffic channels of the fullrate channel to voice and data, and a channel handling device (44), which comprises at least one voice channel means (66, 68, 70) connected to a respective channel input (22, 24, 26) and being arranged to compress signals appearing on this input (22, 24) or to pass at least part of each signal through unaffected. The compressed or passed signals are fed to a multiplexer (76), which multiplexes signals incoming from the voice channel means to outgoing signals for sending in a fullrate channel on a first telecommunication line (14). A demultiplexer (78) is also included for demultiplexing signals in a fullrate channel.

30 Claims, 4 Drawing Sheets

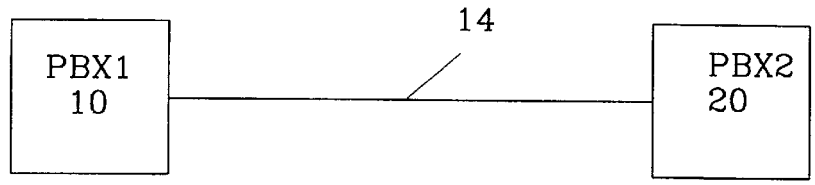
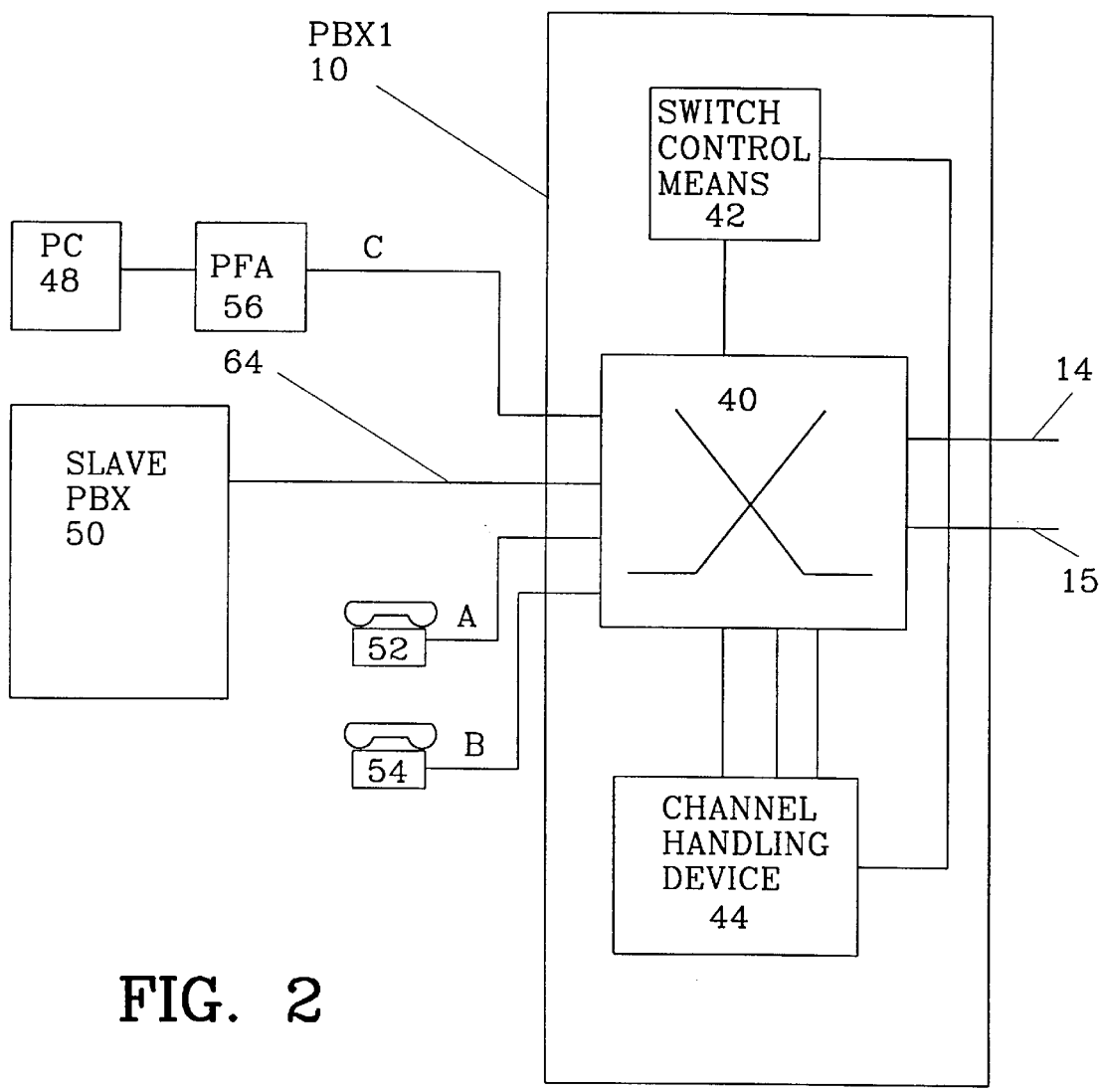
FIG. 1
FIG. 2

PRIVATE BRANCH EXCHANGE, TELECOMMUNICATION SYSTEM AND METHODS OF TRANSMITTING SIGNALS IN SUBRATE CHANNELS

FIELD OF INVENTION

The present invention relates to a private branch exchange, a telecommunication system comprising such a private branch exchange as well as methods of transmitting signals. The invention relates more particularly to transferral of speech, data and signalling between two exchanges or nodes in a telecommunication network using as little bandwidth as possible.

DESCRIPTION OF RELATED ART

A problem in private telecommunication networks of today is the cost of transmitting voice and data over telecommunication lines between different nodes of the private network. The nodes of a private network are sometimes connected to each other via either leased lines or a public network. Due to the high costs for using leased lines and public networks there exist within the field a desire to use these connections in a more efficient way.

One way is to compress speech. When speech is compressed the digital voice signal is reduced in number of bits and therefore the capacity to transmit voice signals is enhanced and in this way several more voice channels can be transmitted in the part of a telecommunication line originally reserved for one voice channel, this part is usually called a time slot.

In the telecommunication standard ITU-T I.460 there is described multiplexing of streams into subrate channels of a fullrate channel in ISDN (Integrated Services Digital Network). The telecommunication standard CCITT V.110 describes multiplexing of asynchronous data channels into such subrate channels and U.S. Pat. No. 4,965,787, which also mentions the standard V.110, describes rate adaptation of data channels to subrate channels and the use of a telecommunication switch which has a granularity corresponding to the size of a subrate channel, i.e. the switch switches the channels with the rate of a subrate channel. None of these documents do however mention the use of compressed voice.

WO97/24903 describes dynamic allocation of voice and data in channels each having a rate of 16 kb/s on a transmission line having a rate of 64 kb/s. This document, filed by the present applicant, has however been published after the priority date of the present application.

U.S. Pat. No. 5,301,190 describes an exchange which is connected to a telecommunication line via a transmission device. The exchange operates with channels having a rate of 64 kb/s, while the telecommunication line has channels with a rate of 16 kb/s. The document thus concerns the adaptation of an exchange operating with a high bit rate to a network having transmission lines where channels use a low bit rate.

WO93/16568 describes how voice signals are compressed and packed, in an exchange, in time slots already comprising compressed signals.

EP-A2-705 052 describes how subrate channels comprising compressed speech and transported in a fullrate channel are received in an exchange and switched through this exchange by adding dummy bits to the compressed signals in order to switch as a word through the switch.

U.S. Pat. No. 5,467,353 describes a fullrate D-channel in which one subrate channel is used for a D'-channel comprising control information and the rest of the fullrate D-channel is filled with B'-channels, which are subrate channels comprising either speech or data. There is also described how a first fullrate D-channel is used together with a second fullrate channel, in which second fullrate channel a subrate D'-channel is multiplexed with subrate B'-channels. The B'-channels are described as being able to comprise voice signals but also data from computers. There is however nothing describing the simultaneous occurrence of data and speech in the fullrate channel or how such subrate channels are assigned.

U.S. Pat. No. 5,555,541 also describes the use of a fullrate D-channel, in which a subrate D-channel is multiplexed with subrate B-channels. The subrate B-channels are said to comprise either compressed voice or data. The document does however not, in the same way as mentioned above in relation of U.S. Pat. No. 5,467,353, describe the simultaneous occurrence of data and speech in the fullrate channel or how such subrate channels are assigned.

The problem with all the systems in the documents mentioned above is that all of them, except perhaps the system in WO97/24903, describe inflexible systems that do not allow the flexible and effective use of a fullrate channel when one wants to be able to transmit both compressed speech and data in an efficient way.

SUMMARY OF THE INVENTION

The present invention attacks the problem of providing possibility of more efficient and flexible transmission of voice and data channels in at least one fullrate channel set up between two private branch exchanges in order to reduce the cost of said transmission.

This is solved through multiplexing the signals sent in voice and/or data channels, possibly together with an information channel, into different subrate channels of at least one fullrate channel. The allocation of subrate channels is performed dynamically and according to demand.

An object of the present invention is thus to provide a private branch exchange and a telecommunication system comprising such a private branch exchange, where more efficient and flexible sending of signals in voice and/or data channels is provided between said exchange and another exchange.

This object is achieved through a private branch exchange and a telecommunication system comprising such a private branch exchange, where the exchange comprises a switch control means and a channel handling device. The switch control means dynamically allocates subrate traffic channels in a fullrate channel as subrate voice channels and subrate data channels in dependence of demand. The channel handling device comprises at least one voice channel means that compresses signals arriving at the channel handling device to signals intended for at least one first subrate voice channel through a multiplexer or passes at least a part of each incoming signal unaffected to the multiplexer. The multiplexer is connected to each voice channel means and multiplexes incoming signals to outgoing signals in at least two subrate channels in the fullrate channel.

Another object is to provide a more efficient and flexible method of sending signals in voice and/or data channels from a first private branch exchange to a second private branch exchange.

This is accomplished through a method of sending signals in a number of voice and information channels in a fullrate channel having the steps of: dynamically allocating subrate traffic channels for use as subrate voice channels and subrate data channels in dependence of demand, receiving at least one first stream of signals to be output in one subrate voice channel or in at least one subrate data channel in said fullrate channel, processing each first stream according to a first or a second processing step, multiplexing each processed first stream into at least one corresponding subrate channel of the first fullrate channel and sending the multiplexed streams in the fullrate channel to the second exchange. In the first processing step each signal in the first stream is compressed if it is to be output in a subrate voice channel and in the second processing step at least part of each signal of the first stream is passed unaffected to a multiplexer if it is intended for at least one subrate traffic channel.

Another object of the present invention is to provide private branch exchange and a telecommunication system comprising such a private branch exchange, where more efficient and flexible reception of signals in voice and/or data channels is provided between said exchange and another exchange.

This object is achieved through a private branch exchange and a telecommunication system comprising such a private branch exchange, where the exchange comprises a switch control means and a channel handling device. The switch control means dynamically allocates subrate traffic channels in a fullrate channel as subrate voice channels and subrate data channels in dependence of demand. The channel handling device comprises a first demultiplexer receiving signals sent in subrate channels of a first fullrate channel from the other exchange. The demultiplexer demultiplexes signals from at least two subrate channels into at least two separate streams. All subrate channels, perhaps except for one subrate information channel, are subrate voice channels or subrate data channels or a combination of subrate voice and subrate data channels. A plurality of voice channel means, one for every subrate data and/or voice channel of the first fullrate channel, are connected to the demultiplexer and either decompress signals appearing in respective subrate channels or pass them substantially unaffected through to a respective channel output, where there is one channel output per voice channel means.

Yet another object of the present invention is to provide a more efficient and flexible method of receiving, in a second private branch exchange, signals in voice and/or data subrate channels of a fullrate channel sent from a first private branch exchange.

This object is achieved through a method comprising the steps of dynamically allocating subrate traffic channels for use as subrate voice channels and subrate data channels in dependence of demand, receiving, in a demultiplexer, signals sent in at least two subrate channels of a fullrate channel from the first exchange, demultiplexing the signals from all subrate channels into separate streams, where each stream, perhaps with the exception of a first stream, comes either from a respective subrate voice channel or at least one respective subrate data channel and processing each stream, with the exception of the first stream, according to a first or a second processing step in dependence of the allocation performed. In the first processing step signals in the stream coming from one subrate voice channel are decompressed and supplied to a respective channel output. In the second processing step signals in the stream coming from at least one subrate traffic channel are passed essentially unaffected to a respective channel output means possibly together with added filler bits.

With the present invention a flexible and effective use of a fullrate channel is accomplished, where the fullrate channel is filled with data or compressed voice channels in dependence of demand. A data channel can furthermore occupy more than one subrate channel and the different types of traffic channels can have different priorities so that the fullrate channel is used as efficiently as possible.

The invention will now be described in more detail using preferred embodiments and with reference to the appended drawings.

BRIEF DESCRIPTION OF THE DRAWINGS

FIG. 1 shows a block schematic of two interconnected nodes in a telecommunication system according to the invention, FIG. 2 shows a telecommunication node incorporating the channel handling device according to the invention, from which node signals are sent.

DETAILED DESCRIPTION OF PREFERRED EMBODIMENTS

Figure 3:
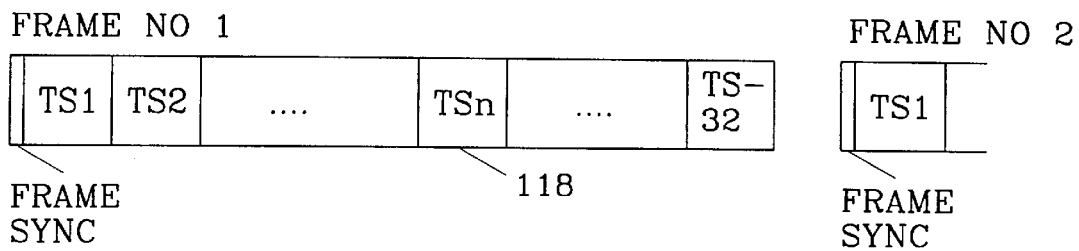
FIG. 3 shows the frame structure comprising time slots sent on a telecommunication line between two telecommunication nodes

In FIG. 1 is shown a preferred telecommunication network according to the present invention. The preferred network comprises two telecommunication nodes in the form of private branch exchanges PBX1 10 and PBX2 20 connected to each other via a first telecommunication line 14. The telecommunication line is in this case a leased line having a transmission capacity of 2048 kbit/s, but the two private branch exchanges could just as well have been connected through a public telecommunication network such as PSTN (Public Switched Telecommunication Network) or ISDN (Integrated Services Digital Network). The transmission capacity of the telecommunication line could of course also be different.

FIG. 2 shows PBX1 10, which acts as a first telecommunication node. This node comprises a first switchcore 40 connected to the first telecommunication line 14 as well as to a second telecommunication line 15 also leaving that node and also connected to the second node (not shown), these lines are intended for reception and sending of signals in order to achieve a duplex connection. A first channel handling device 44 according to the invention is connected to the first switchcore 40. The node 10 further comprises a switch control means 42 connected to the switchcore 40 and the first channel handling device 44. This switch control means 42 is the central control means in the node, which is among other things responsible for setting up and closing down telecommunication connections. A computer 48 is also connected to the switchcore 40 via a PFA (Packet Frame Aligner or Packet Frame Switch) 56 in order to show how a computer channel C is set up with another computer connected to another node. A PFA is something well known in the art and will therefore not be further described here.

A first originating subscriber equipment 52 or terminal equipment is connected to the first switchcore 40 in order to show how a first voice channel A will be set up and a second originating subscriber equipment 54 is connected to the first switchcore 40 in order to show how a second voice channel B is to be set up. A subordinate private branch exchange, slave PBX, 50 is connected to the switchcore 40 via a trunk line 64. The slave PBX 50 does of course also have subscriber devices connected to it. The number of subscriber devices connected to the node can of course also be varied. The slave PBX 50 is included because the PBX or node according to the invention can be connected to another and usually older PBX in order to transfer signals from that older PBX in subrate channels.

The switch control means 42 and the first switchcore 40 function to set up connections between different subscriber equipment and computer equipment connected to the node or connected to different nodes, where a connection path is connected via the first switchcore 40 through the control of the switch control means 42. When a connection is set up between equipment connected to different nodes, for example via the first telecommunication line 14, one such connection or channel gets allocated a part of the transmission capacity of said telecommunication line 14.

In FIG. 3 is shown the transmission format of a telecommunication line. Signals are sent in a transmission format that is divided into consecutive frames, frame no. 1, frame no. 2, where each frame has a certain transmission rate. Each frame begins with a synchronisation signal frame sync and the rest of the frame is divided into several channels TS1, TS2, TSn, TS-32 or time slots, and a channel occupies a certain time slot in a number of consecutive frames. According to this invention one such channel 118 in a time slot TSn is named a fullrate channel and will be used for subrate channels. The frames are sent with above mentioned rate of 2048 kbit/s, where each frame contains 32 time slots, each having a transmission rate of 64 kbit/s. A channel is normally set up in dependence of signalling between the terminal equipment and a special channel is normally used for signalling. All this is something that is well known to the man skilled in the art and will therefore not be further mentioned here.

Figure 4:
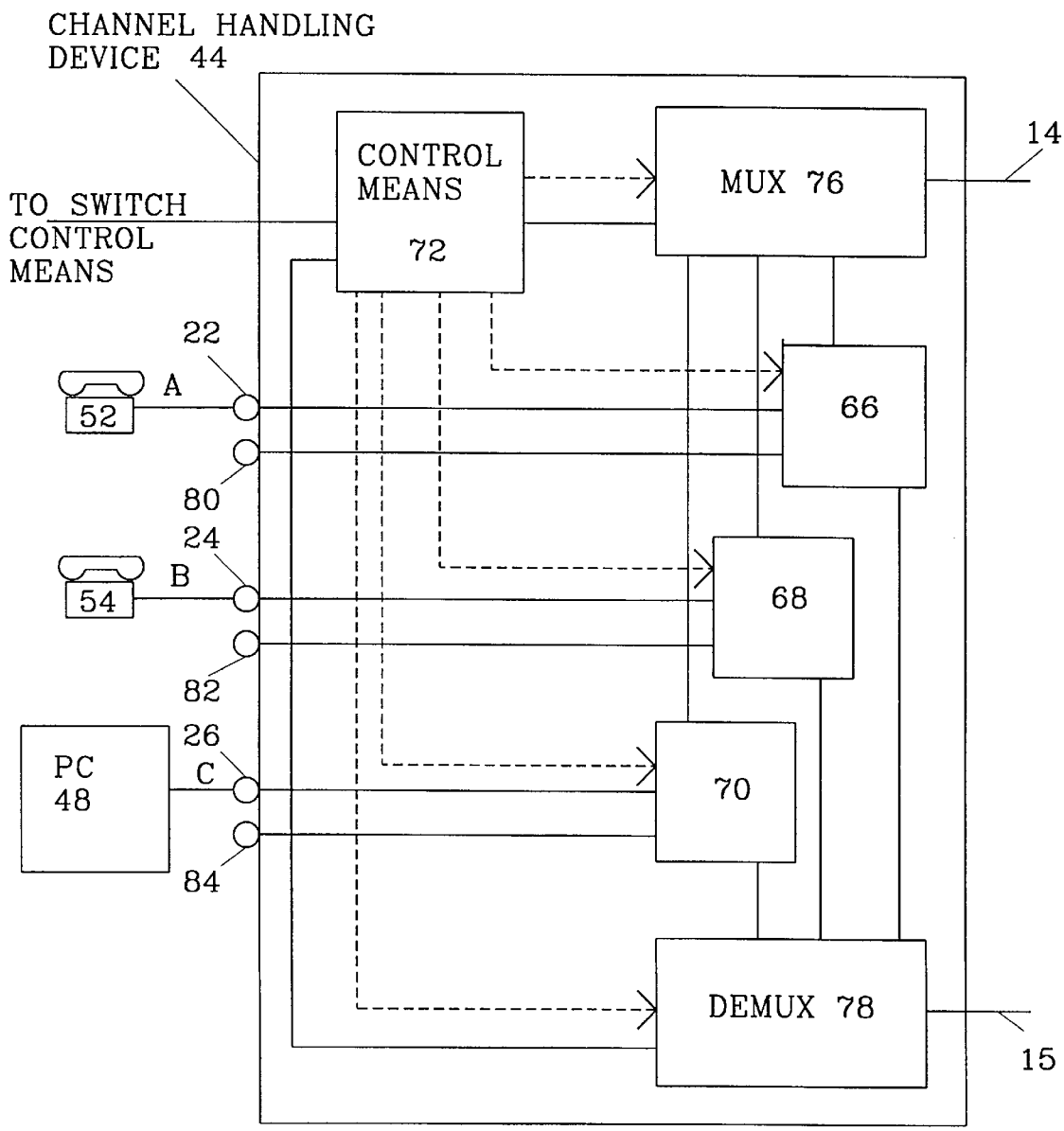
FIG. 4 shows the channel handling device in more detail.

FIG. 4 shows a first channel handling device 44 according to a preferred embodiment of the invention. The channel handling device 44 comprises three voice channel means 66, 68 and 70, where each is connected to a channel input 22, 24, 26, respectively, which can be connected to a subscriber equipment or a computer or some other equipment via the previously mentioned switchcore. In the figure a first of these voice channel means 66 is connected to the first originating subscriber equipment 52 for the first voice channel A, a second 68 to the second originating subscriber equipment 54 for the second voice channel B and a third 70 to a computer 48 for the data channel C. The voice channel means are essentially implemented in the form of digital signal processors incorporating voice compression and decompression means as well as bit adding and bit subtracting means. All the voice channel means 66–70 are connected to a multiplexer 76 and to a demultiplexer 78. The multiplexer 76 is connected to the first telecommunication line 14 and the demultiplexer is connected to the second telecommunication line 15. The voice channel means 66–70 are also connected to a respective channel output 80, 82 and 84. The multiplexer 76 and demultiplexer 78 are connected to a control means 72, also called a local control means, for reception of signalling information. The voice channel means 66–70, the multiplexer 76 and the demultiplexer 78 are controlled by the control means 72, which is indicated by dashed lines in the figure. The voice channel means 66–70 are all shown as being connected directly to the subscriber equipment 52, 54 and the computer 48. This is only done in order to simplify the understanding of the invention. They are in reality set up to said equipment via the first switchcore of the node. The same observation applies to the telecommunication lines 14 and 15. The subscriber equipment or computer could also have had been in contact with the channel handling device via the slave PBX shown in FIG. 2. The control means 72 is also connected to the switch control means of the node for receiving control information and signalling information from it as well as sending signalling information to it. The control means 72 is preferably arranged in the form of a processor connected to appropriate memory devices and loaded with suitable software.

Figure 5:
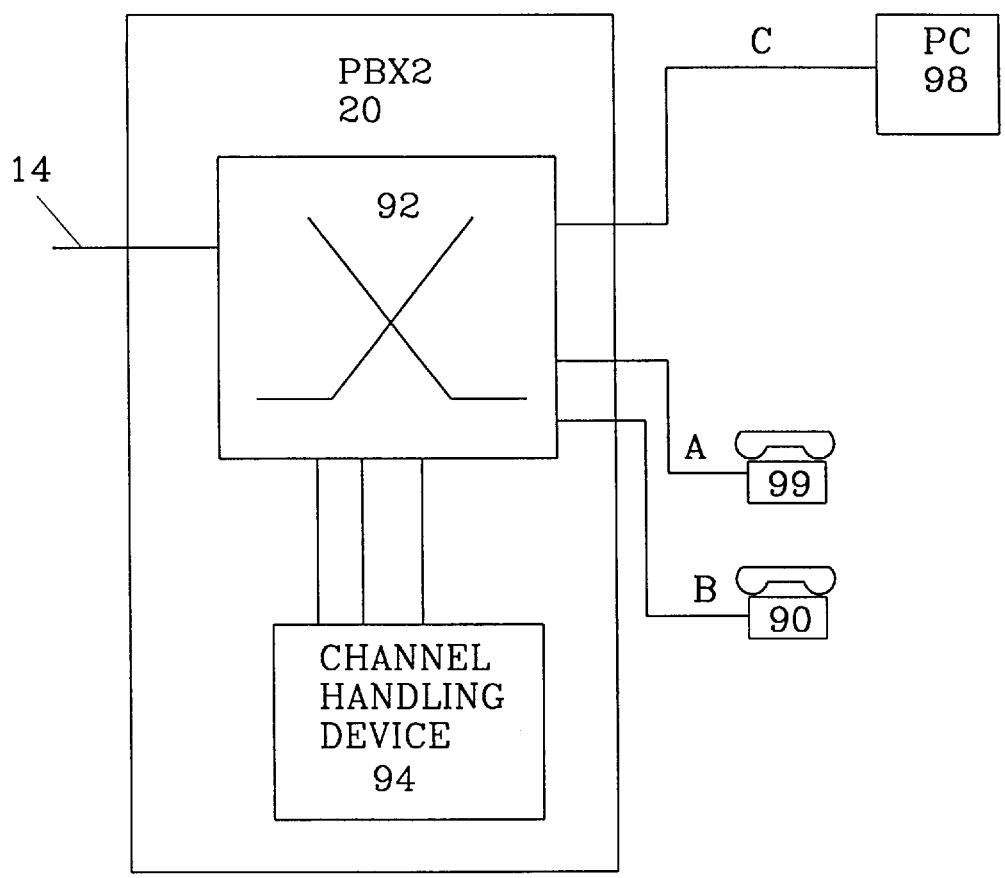
FIG. 5 shows a telecommunication node incorporating a channel handling device according to the invention, in which node signals are received.

FIG. 5 shows the second telecommunication node PBX2 20 comprising a second switchcore 92 and a second channel handling device 94 connected to it. A first terminating subscriber equipment 99 for the first voice channel A to be set up, a second terminating subscriber equipment 90 for the second voice channel B to be set up are connected to the second channel handling device 94 via the second switchcore 92, which switchcore is connected to the telecommunication line 14. A second computer 98 is also connected to the second switchcore 92 for setting up the data channel C. A second PFA is of course connected between the second computer 98 and the second switchcore 92 but has been omitted in this figure.

Figures 6A, 6B:
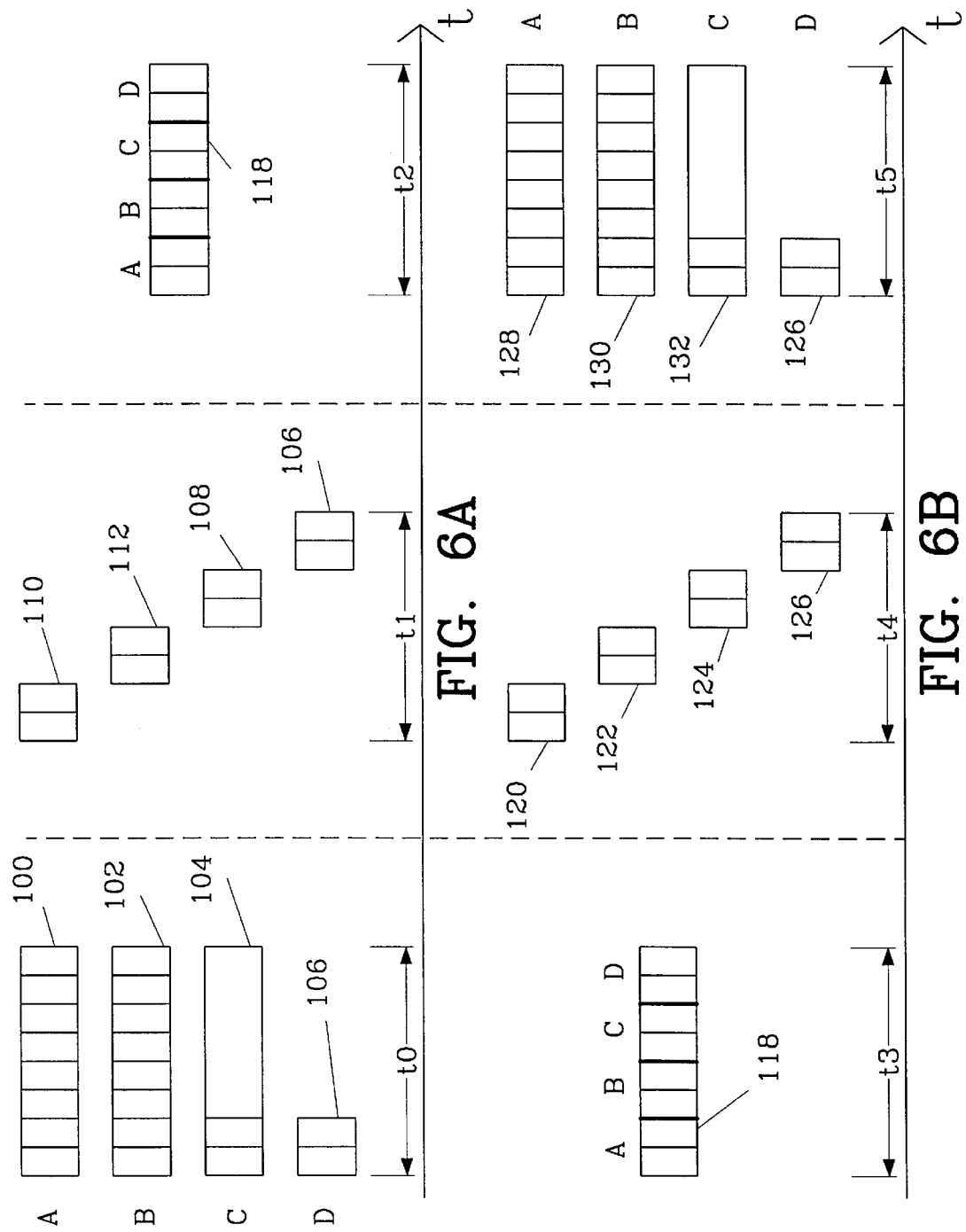
FIG. 6a shows signals sent from the node shown in FIG. 2.
FIG. 6b shows signals received in the node shown in FIG. 5

FIG. 6a shows uncompressed voice signals 100, 102 for the voice channels A and B in the form of two time slots at a first time interval t0, and these signals arrive at the first node from the first and second originating subscriber equipment in FIG. 4. Each time slot is 8 bits wide and represent, given the previously mentioned bit rate of the telecommunication line, a channel bit rate of 64 kbit/s. A first data stream 104, comprising two bits of data from the first computer followed by six filler bits added by the PFA is shown at the same time interval t0, which two data bits are sent in the data channel C and consequently has a bit rate of 16 kbit/s. The filler bits are in the figure indicated by an empty box having the size of six bits. A second data stream 106, two bits wide and having a bit rate of 16 kbit/s is also shown for the same time interval. This second data stream 106 is made up of signalling information supplied by the switch control means to the control means of the channel handling device, which is to be supplied to a switch control means of a second telecommunication node. The figure goes on to show two compressed voice signals 110, 112, each having a width of 2 bits, arriving from the voice channel means together with the data stream 108 supplied by the computer minus the filler bits and the signalling information 106 from the control means, all at the multiplexer at a later second time interval t1 and displaced in time from each other. After the second time interval t1 follows a third time interval t2, during which a multiplexed signal 118, which consists of the different signals appearing during the time interval t1, is output from the multiplexer to the first telecommunication line.

FIG. 6b shows this last multiplexed signal 118 being received at the second telecommunication node 20 at a fourth time interval t3, followed by the demultiplexing of this signal 118 into separate two-bit streams 120, 122, 124 and 126 at a fifth time interval t4. Finally the two bit streams that are voice channels are decompressed into two eight bit streams 128 and 130, filler bits are added to the data stream 124 in the data channel C to achieve an eight bit signal 132 suitable for switching within the second node and the signalling information 126 remains unaltered. The voice signals 128 and 130 as well as the eight bit data signal 132 are supplied to the first and second terminating subscriber equipment and the second computer at the sixth time interval t5, while the signalling information 126 is supplied to the control means of the channel handling device in the second node.

The working of the invention will now be described.

What happens first, with reference made to FIGS. 1–5, is that a first telephone channel A is set up between the first originating subscriber equipment 52 connected to PBX1 10 and the first terminating subscriber equipment 99 connected to PBX2 20, a second telephone channel B is set up between the second originating subscriber equipment 54 connected to PBX1 10 and the second terminating subscriber equipment 90 connected to PBX2 20 and a data channel is set up between the first and the second computer 48, 98. The setting up of such channels is, as always in telecommunication, performed through signalling using A- and B-numbers. The nodes 10, 20 then communicate with each other via a signalling channel in order to set up a connection. In this signalling channel special signalling or so called D-channel information can then be transmitted, where the D-channel information can be such things as A- and B-numbers or information related to different kind of services and which channel is to be used for which connection. This is something well known within the art. This signalling channel is however in the present invention set up via the channel handling device and more particularly via a special subrate channel, the subrate information channel, which is controlled by the control means 72.

Under the presumption that a subrate channel has a fixed bit rate of 16 kbit/s and thus occupies 2 bits out of 8 in a fullrate channel and that the different channels are set up using ordinary signalling protocols, like for example the ISDN protocol LAPD or ECMA/ISO Q-SIG, however using a subrate channel for signalling, the setting up of subrate channels is performed in the following way.

The switch control means 42 receives information of the fact that a first originating subscriber equipment 52 wants to call a first terminating subscriber equipment 99. This is achieved by a person at the originating equipment lifting the telephone hook and dialing the number associated with the terminating equipment, the B-number. The switch control means 42 then analyses this B-number in a conventional way perhaps together with the A-number, the number of the first originating subscriber equipment, and finds out that the terminating subscriber equipment 99 is associated with a second telecommunication node 20 to which signals can be sent in subrate channels of a fullrate channel on the first telecommunication line 14. The switch control means 42, which is equipped with a table containing all possible subrate channels A, B, C, D between the two nodes and the status of each subrate channel, i.e. if they are occupied or not, sends ordinary signalling information concerning the connection to be set up together with control information to the control means 72 in the channel handling device 44. This control information sent to the control means 72 contains information of which subrate channel or subrate channels are to be used, at which channel input 22, 24, 26 the signals that are to be sent in said subrate channel or subrate channels will appear on and which type of connection is to be set up, i.e. if it is voice or data and possibly which bit rate is being used, i.e. how many bits in a time slot received at a channel input really comprises information. During this signalling the two exchanges thus allocate which subrate channels are to be used for traffic in the fullrate channel and the type of traffic. These subrate channels or subrate traffic channels are therefore called subrate voice channels for use in voice traffic and subrate data channels for use in data traffic.

The switch control means 42 first of all transmits the signalling information to the channel handling device 94 in the second node 20 using the subrate information channel (D) and then controls, if the channel, after exchange of signalling information between the two switch control means, is to be set up, the appropriate voice channel means 66, 68, 70 and the multiplexer 76 to set up at least one subrate channel (other than the subrate information channel) on the fullrate channel leaving the node. This setting up is done through the control means 72 receiving, from the switch control means 42, the synchronisation signal frame sync used for synchronising a frame to be sent on the first telecommunication line 14 and using that synchronisation signal to generate timing signals for controlling the respective voice channel means to supply signals to the multiplexer 76 in the subrate channel or subrate channels to be used.

It is quite a simple task to compute when the timing signals are to be applied to the multiplexer 76 and the voice channel means 66, 68, 70 as the fullrate channel 118 is to occupy a certain time slot TSn set up in advance, the length of which is known. The control means 72 can easily determine when to send a first timing signal to the multiplexer 76 for starting to send all the signals in the fullrate channel 118 output on the first telecommunication line 14 in this time slot TSn, by adding the number of the time slot preceding the time slot TSn multiplied with the length of a time slot to the time of the synchronisation signal Frame sync. It is in the same way easy to compute when to send a second timing signal to the multiplexer 76 for stopping the sending of the signals in the fullrate channel 118 by adding the number of the time slot TSn multiplied with the length of a time slot to the synchronisation signal Frame sync. To determine when a third timing signal is to be applied for the selection of when signals are to be started to be received by the multiplexer from a selected voice channel means is determined by adding, to the time of the first timing signal, the number of subrate channels preceding the subrate channel or channels to be occupied multiplied with the length of a subrate channel. To determine when a fourth timing signal is to be applied for the selection of when signals are to be stopped to be received by the multiplexer from the selected voice channel means is determined by adding, to the third timing signal, the number of subrate channels the signals are to occupy multiplied with the length of a subrate channel. Which subrate channel or channels are to be occupied, is of course notified to the control means 72 by the switch control means 42.

As is evident from what has been described above a subrate channel is here defined as having a fixed width of 2 bits or a rate of 16 kbit/s in the preferred embodiment.

Having thus set up a voice channel means with a subrate channel the voice channel means are individually controlled in different ways depending on which type of connection is set up. In the example given above a first connection is set up between two sets of subscriber equipment.

Referring more particularly to FIGS. 4, 5 and 6a, the signals 100 from the first originating subscriber equipment 52 are supplied to a first voice channel means 66. At the same time a second connection from the second originating subscriber equipment 54 to the second voice channel means 68 is set up in the same way as the first connection. Voice signals in the ordinary eight bit format 100, 102 are sent from the originating subscriber equipment to these voice channel means 66, 68 in a first and second stream.

At the same time a third connection is set up between the first and second computer 48, 98. For this connection signalling is basically performed in the same way as for the voice connections. A data channel can however, in dependence of demand, occupy one or more subrate channels and when setting up this third connection, the switch control means 42 has to inform the control means 72 of which subrate channels are to be used so that the control means 72 in turn can set a voice channel means to use all these subrate channels. The switch control means 42 furthermore sees to it that the PFA 56, to which the computer 48 is connected sends data signals having the same transmission rate as all the subrate channels to be occupied have together. This is achieved by the PFA 56 sending data in a structure adapted to the structure used for switching in the switchcore 40. The switchcore 40 uses time slots that are eight bit long. In order to send data to be used in one or more subrate channels, the PFA first takes as many data bits as can be sent in the subrate channels and then adds filler bits to these data bits so that a full eight bit time slot is created. This time slot is then sent to the selected voice channel means. In the example used here only one subrate channel C is used for data and the selected voice channel means 70 receives a signal 104 having only two bits of data followed by six filler bits in a third stream. Signalling information 106 is at the same time supplied by the control means 72. All these signals except for the signalling information are sent to the voice channel means during the first time interval t0.

In the second time interval t1, the two voice channel means 66 and 68 process the incoming eight bit voice signals 100, 102 in the two channels A and B by compressing them into two bit signals 110 and 112 using an LD-CELP compression algorithm according to the ITU-T standard G.728. The control means 72 set these two voice channel means 66, 68 to compress signals based on the control information received from the switch control means 42. At the same time the third voice channel means 70, has been controlled by the control means 72 to process the data signal by passing it substantially unaffected through the third voice channel means 70. It has been set, also in dependence of the control information from the switch control means 42, to drop the filler bits and to pass the two original data bits 108 through. The compressed signals 110 and 112 and the data signal 108 are then fed to the multiplexer 76 together with the signalling information 106 from the control means 72. All these signals have now equal length and are fed to the multiplexer displaced in time from each other under the control of the control means 72.

As is well known to the person skilled in the art a multiplexer performs multiplexing through obtaining the signals at different inputs at consecutive local time intervals of equal length and mixing these signals into one signal having a length equal to the sum of all local time intervals.

The multiplexer multiplexes the four signals, during the third time interval t2, into a multiplexed signal 118 having a length of eight bits, which is equal to the length of signals sent in channels on telecommunication lines. The multiplexer 76 has thus created four subrate channels A, B, C, D in a fullrate channel 118. The signals in the fullrate channel are then sent to the second node 20 over the first telecommunication line 14. This fullrate channel 118, now containing the subrate channels A, B, C and D, is always set up between the two telecommunication nodes using one special time slot in each consecutive frame on the telecommunication line 14. The subrate information channel 106 does furthermore always occupy a dedicated subrate channel in this fullrate channel and the control means of each channel handling device is configured to automatically check that subrate channel in order to find any signalling information concerning all subrate channels set up for voice and/or data.

The reception of the subrate channels and their demultiplexing will now be explained with reference to FIGS. 4, 5 and 6b.

The second channel handling device 94 is identical to the first channel handling device 44, so FIG. 4 can be used in explaining the reception of the subrate channels.

The signals in the fullrate channel 118 on the first telecommunication line 14 are received by the second node 20, which immediately switches them through the switchcore 92 to the demultiplexer 78 of the channel handling device 94. The switch control means of this second node 20 has here already set up the connections between appropriate voice channel means and terminating subscriber equipment since it already knows, through the previously performed signalling, which subrate channels contain which information. The only difference here being that signalling information is first received in the subrate information channel and transmitted to the switch control means of this second node, which switch control means then sends control information to the control means 72 of the second channel handling device 94 for connection of voice channel means to the demultiplexer 78. The control means of this second node 20 then sets up a path between the demultiplexer 78 and a first voice channel means 66. The path continues from the first voice channel means 66 via the first channel output 80, through the second switchcore 92 to the first terminating subscriber equipment 99 for the first voice channel A. The control means has also set up a path between the demultiplexer 78 and a second voice channel means 68, which path continues via the second channel output 82, through the second switchcore 92 to the second terminating subscriber equipment 90 for the second voice channel B. The control means has also set up a path between the demultiplexer 78 and the third voice channel means 70, which path continues via the third channel output 84, through the switchcore 92 and a respective PFA (not shown) to the second computer 98 for the data channel C. The control means 72 also has access to the demultiplexer 78 in order to obtain the signals sent in the information channel D. As is well known to the man skilled in the art, a path from a multiplexer to a certain means is effected through controlling the demultiplexer to be in contact with this certain means only during the period of time the signal to be fed in that path appears in the demultiplexer and the timing signals for doing this are effected in essentially the same way as has been previously described.

With these paths set up, the demultiplexer 78 now receives the signal 118 sent from the first channel handling means in the first node during a fourth time interval t3, which signal is sent in a fullrate channel comprising the subrate channels A, B, C and D. The demultiplexer 78 then demultiplexes this signal 118 into four separate streams of two-bit signals 120, 122, 124 and 126 displaced in time from each other during a fifth time interval t5, where a first of these signals 120 is the compressed voice signal sent in channel A, a second 122 is the compressed voice signal sent in channel B, a third 124 is a data signal sent in the data channel C and the fourth 126 is signalling information sent in the information channel D. During a sixth time interval t5, the two voice signals are decompressed in the voice channel means 66 and 68, respectively, into two eight-bit signals 128 and 130, where a first of these 128 is the decompressed signal in the first voice channel A and is supplied to the first terminating subscriber equipment 99 and the second 130 is supplied to the second terminating subscriber equipment 90. The two voice channel means have been individually set to decompress signals by the control means 72. The control means 72 has in turn received control information from the switch control means of the second node 20 for performing this. Six filler bits are added to the two-bit data signal 124 for switching through the node so that an eight bite signal 132 is supplied to the second computer 98. Also this mode of operation in the third voice channel means 70 has been set by the control means 72 in dependence of control information received from the switch control means of the second node. The signalling information 126 is finally supplied to the control means 72 for supply to the switch control means.

The decompression algorithm used is also this one of the type LD-CELP according to the ITU-T standard G.728.

The previous description only described transferring of signals in one direction, from the first telecommunication node to the second telecommunication node. A respective channel far each voice and information channel is of course also set up in the same manner in the opposite direction in order to achieve a duplex connection. The channels could also have been set up from different nodes. The first voice channel could for example have been set up from the first node, while the second voice channel could have been set up from the second node. The same applies for the data channel.

In the previous description a control means was arranged in every channel handling device. The function of the control means could just as an alternative be incorporated in the switching control means. A normal signalling channel could also have been used instead of a subrate information channel.

The way the subrate channels have been set up in the fullrate channel can be varied in many ways according to demand. The only channel that is not varied is the information channel. It always occupies a certain subrate channel within a certain fullrate channel and in the case of a permanent connection between the two nodes, such as when using a leased line, the fullrate channel used on that line is also known in advance. All other subrate channels within the fullrate channels can however be used either as subrate voice channels or subrate data channels in dependence of demand. Here there can be different priorities as well. Voice channels could always be set up if needed and data channels only when a subrate channel is free. All subrate channels except for the information channel could also, for example during a limited period of time, be reserved for data signals. The subrate data channels need also not only be limited to computers, but other devices such as facsimile equipment could also be connected in this way. The size of a subrate data channel can of course also be varied during use in dependence of available subrate channels. It can thus both grow in size and shrink in dependence on how many subrate voice channels are to be used in the same fullrate channel.

Dynamic allocation of voice and data is described in more detail in the international application WO97/24903. This document is hereby incorporated by reference.

The channel handling device need furthermore not be limited to only one fullrate channel containing subrate channels, but can also handle one or more further fullrate channels comprising subrate channels. In this case a new multiplexer/demultiplexer pair must be incorporated in the channel handling device for every such further fullrate channel and every such further multiplexer/demultiplexer pair will have as many voice channel means connected to them as there are subrate channels. In this case all the further subrate channels convey data or voice, where the signalling concerning these further subrate channels is handled by the information channel set up using the first mentioned multiplexer/demultiplexer pair. The number of further fullrate channels used in this way is determined by the capacity of the information channel for transmitting signalling information. If subrate channels, the number of which exceed said capacity, are wanted, a further information channel is provided. The control means could then be divided into several subcontrol means, each controlling a multiplexer/demultiplexer-pair.

The example given of the compression used was from eight to two bits. The invention is however not limited to these figures. A compression from eight to four or eight to one could for example also have been used. When compressing from eight to one bit, the voice channel means do however need to incorporate echo cancelling units. The number of voice channel means connected to each multiplexer/demultiplexer pair is thus varied according to how much compression is used.

The example described above related to a permanent connection between two nodes. The invention can however also be used with public telecommunication networks such as ISDN or PSTN. In this case the position of the fullrate channel has to set up by signalling through the public network. That is first signalling takes place in order to set up the fullrate channel, possibly followed by signalling in order to set up further fullrate channels and then signalling is performed in the subrate information channel, where the subrate information channel is always the same subrate channel within this fullrate channel, i.e. occupies the same position within the fullrate channel. When using the public switched network one has also to assure that the public network does not perform any compression of the signals, because if that is the case all the information into the fullrate channel would be lost.

Figure 7:
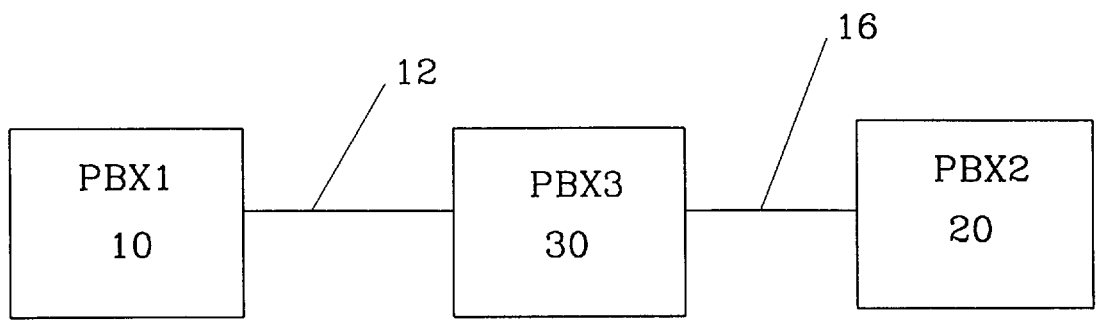
FIG. 7 shows a block schematic of a variation of a telecommunication system according to the invention incorporating a transit node.

FIG. 7 shows a modified telecommunication system according to the invention. The system in FIG. 7 differs from the one in FIG. 1 in that it comprises a telecommunication node acting as a transit node and is arranged in the form of a central private branch exchange PBX3 30, to which PBX1 10 is connected with a first telecommunication line 12 and PBX2 20 with a second telecommunication line 16 of the same type as the first telecommunication line 14. The PBX3 30 is a central PBX and acts as a central node for the telecommunication system. This PBX3 30 could also be connected to more private branch exchanges.

In this system the voice and/or data signal arriving at the transit node PBX3 30 in a subrate channel and destined for the second node PBX2 20 is put in a frame or time slot in the transit node, where the time slot is filled with filler bits. This time slot, which has the size of the fullrate channel is then switched through the transit node. When the time slot has been switched through the node, the filler bits are removed and the remaining signal is then multiplexed into a subrate channel, which is set up in a fullrate channel between the transit node and the second node. This system is described in more detail in the Swedish patent application SE9603588-6 with the title "Arrangement and method relating to information switching", filed by the same applicant Oct. 1, 1996 and is herein incorporated by reference.

Above mentioned switched subrate channels including compressed voice could of course also be combined with newly compressed voice channels in the multiplexer according to the invention. The already compressed voice signals would be supplied to a voice channel means of a channel handling device in an eight-bit word, where for example only 2 out of the eight bits comprised information. These two bits would then pass through the voice channel means unaffected in order to be multiplexed into a certain subrate channel, while another subrate channel would contain a voice signal that was compressed in the same channel handling device or perhaps a data signal. A fullrate channel that is received in a channel handling device can of course also be treated in the opposite way, i.e. passed through a voice channel means unaffected (with filler bits added) while the content of another subrate channel of the fullrate channel is decompressed.

The invention could also comprise a further feature in that the subrate information channel could be used to transmit data as well as signalling information. In this case a data access means in the form of a PFA or Packet Frame Switch is connected to the information channel means and the PFA investigates the content of the information channel means and if at least a part of this content does not represent any real signalling information, i.e. does not contain any useful information, that part is removed and replaced by data signals. In this way the information channel is used in a more effective way as a combined signalling/data channel. All this is described in more detail in the Swedish patent application SE9603598-5 with the title "Arrangement and method relating to handling of information in a communications network and a communications network comprising such arrangement", filed by the same applicant Oct. 1, 1996 and is herein incorporated by reference.

The invention is of course not limited to the embodiments described above and shown in the drawings, but can be modified within the scope of the appended claims.

We claim:

1. Private branch exchange (10) for communication with other private branch exchanges (20) using compressed voice channels and data channels and comprising
   a switch control means (42) for setting up at least one fullrate channel (118) leaving said private branch exchange (10) on a first telecommunication line (14), which fullrate channel is arranged for connection to said other private branch exchange (20), where the transmission format of the first telecommunication line is divided into frames containing a number of time slots (TS1, TS2, Tsn, TS-32) and the fullrate channel occupies a certain time slot (Tsn), and
   at least one channel handling device (44) comprising
   at least one channel input (22, 24, 26) for receiving signals to be output in said fullrate channel,
   at least one voice channel means (66, 68, 70) connected to a respective channel input and being arranged to compress signals (100, 102) appearing on this respective channel input (22, 24) to signals (110, 112) intended for at least one first subrate traffic channel (A, B) or to pass at least part of each signal (104) appearing on this channel input unaffected through the voice channel means to said first subrate traffic channel (C), where a subrate traffic channel can be a subrate voice channel (A, B) or a subrate data channel (C), and
   a first multiplexer (76) connected to each voice channel means and arranged to multiplex signals (100, 108, 110, 112) incoming to the multiplexer to outgoing signals in at least two subrate channels (A, B, C, D) provided in the first fullrate channel (118),
   characterised in that the switch control means (42) is arranged to dynamically allocate the subrate traffic channels in the fullrate channel to compressed voice and data in dependence of demand.

2. Private branch exchange according to claim 1, characterised in that the switch control means is arranged to allocate subrate traffic channels according to a priority scheme.

3. Private branch exchange according to claim 1, characterised in that the channel handling device (44) further comprises a control means (72) connected to the switch control means (42) and to the multiplexer (76), where the control means is arranged to forward signalling information (106) received from the switch control means to the multiplexer in a subrate information channel (D).

4. Private branch exchange according to claim 3, characterised in that the control means (72) is further arranged to, in dependence of control information received from the switch control means, individually control each voice channel means (66, 68, 70) to forward no signals or at least a part of each signal (104) received from the respective channel input (26) unaffected to the multiplexer for transmission in at least one respective subrate traffic channel (C) or to compress each signal (100, 102) received from the respective channel input (22, 24) and to forward the compressed signals (110, 112) to the multiplexer for transmission in a respective subrate voice channel (A, B).

5. Private branch exchange according to claim 3, comprising at least one further multiplexer, where each further multiplexer is arranged to multiplex incoming signals to signals in subrate channels of a respective fullrate channel to the other private branch exchange,
   at least two further channel inputs,
   at least two further voice channel means for each further multiplexer for receiving signals to be output in a further fullrate channel,
   wherein the control means (72) is arranged to, in dependence of further control information received from the switch control means, individually control each further voice channel means to forward at least a part of each signal received unaffected to the corresponding further multiplexer for transmission in a respective subrate traffic channel or to compress each received signal and to forward the compressed signals to the corresponding further multiplexer for transmission in said respective subrate traffic channel.

6. Private branch exchange according to claim 5, wherein the subrate channels of all further multiplexers are used only for subrate traffic channels and the control means (72) is arranged to send all signalling information concerning subrate channels controlled by the control means in the subrate information channel (D) of the fullrate channel output by the first multiplexer (76).

7. Private branch exchange according to claim 3, wherein the control means (72) is connected to all multiplexers (76), possibly in the form of subcontrol means, and every voice channel means (66, 68, 70) and is arranged to control the multiplexing performed and the operation of each voice channel means in dependence of the demand for connections.

8. Private branch exchange according to claim 7, wherein the switch control means (42), when setting up a subrate voice channel between the two private branch exchanges (10, 20), is arranged to
   check, for each multiplexer (76) until a subrate channel free for use as a subrate voice channel is found or all subrate channels have been checked, if there are any unused subrate channels in the fullrate channel (118) associated with the currently checked multiplexer, to control, if there exists such an unused subrate channel, a voice channel means to compress incoming signals to be sent in the subrate channel and to connect said voice channel means, associated with the multiplexer currently checked, with said unused subrate channel and otherwise to further check if any subrate data channels are used in the fullrate channel, and to control, if there is at least one such subrate data channel used, the respective voice channel means and the multiplexer to set one subrate data channel free, to set said voice channel means if it used only one subrate data channel to compress incoming signals and use the freed subrate channel as a subrate voice channel and otherwise to set another voice channel means to compress incoming signals and to connect said another voice channel means with said freed subrate channel and otherwise to continue with checking another multiplexer.

9. Private Branch Exchange according to claim 3, wherein the control mean (72) is connected to the first multiplexer (76) via a data access means and is arranged to send signalling information to the data access means, which data access means in turn is arranged to analyse signalling information and to replace it with data if the signalling information has a code representing the absence of information and otherwise to leave it intact and to forward the analysed and possibly changed information to the multiplexer for transmission in the subrate information channel.

10. Private branch exchange according to claim 3, wherein each multiplexer (76) has a demultiplexer (78) connected in parallel with it, where each demultiplexer (78) is connected to a second telecommunication line (15) for connection to the other private branch exchange (20), on which second telecommunication line one fullrate channel (118) for each demultiplexer arrives in a respective time slot, where the fullrate channel for a first demultiplexer contains a subrate information channel (D), where the other subrate channels of said fullrate channel of the first demultiplexer are subrate voice channels (A, B) or subrate data channels (C) or a combination of subrate voice and data channels and the subrate channels for any further multiplexer contains no subrate information channel, every voice channel means (66, 68, 70) connected to a multiplexer is also connected to the corresponding demultiplexer for reception of signals in subrate channels other than the subrate information channel and connected to a respective channel output (80, 82, 84), every voice channel means (66, 68, 70) is arranged to either decompress signals (120, 122) appearing in respective subrate channels (A, B, C) in said fullrate channel (118) arriving at the corresponding demultiplexer or to pass them (124) substantially unaffected through to the respective channel output (84) and the control means (72) is connected to the first demultiplexer in order to receive signalling information (126) sent in the subrate information channel (D), the control means being arranged to supply this signalling information to the switch control means (42) and, in dependence of control information received therefrom, control each voice channel means to individually receive no signals or signals from at least one subrate channel (A, B, C) of the fullrate channel other than the subrate information channel and to further control each voice channel means to either pass the signals received by the corresponding demultiplexer in the at least one subrate channel essentially unaffected through the voice channel means to the respective channel output (84), possibly together with filler bits added to each signal (C) in order to adapt the format of the signal to a format suitable for switching in the exchange, or either to decompress the signals (120, 122) from the one subrate channel (A, B) and to supply these decompressed signals (128, 130) to the respective channel output (80, 82), if the subrate channel so associated with the voice channel means is a subrate voice channel.

11. Private branch exchange (10) according to claim 10, wherein the control means (72) is arranged, in dependence of control information received from the switch control means (42), to control the voice channel means, which is connected to a demultiplexer and receives signals from a subrate voice channel, to pass each such signal unaffected to a respective channel output together with added filler bits in order to adapt the format of the signal to a format suitable for switching in the exchange.

12. Private branch exchange (20) for communication with other private branch exchanges (10) using compressed voice channels and data channels and comprising a switch control means for setting up at least one fullrate channel (118) arriving at said private branch exchange on at least one first telecommunication line (14), which is connecting said private branch exchange (20) with another private branch exchange, where the transmission format of the first telecommunication line is divided into frames containing a number of time slots (TS1, TS2, Tsn, TS-32) and the fullrate channel occupies a certain time slot (TSn), and at least one channel handling device (94) comprising a first demultiplexer (78) for receiving signals sent in subrate channels (A, B, C, D) of a first fullrate channel (118) from the first other exchange and being arranged to demultiplex signals from at least two subrate channels (A, B, C, D) into at least two separate streams, where all channels, perhaps with the exception of one subrate information channel (D), are subrate traffic channels in the form of subrate voice channels (A, B) or subrate data channels (C) or a combination of both subrate voice and subrate data channels, one voice channel means (66, 68, 70) for every subrate traffic channel of the first fullrate channel, where every voice channel means is connected to the demultiplexer and is arranged to either decompress signals (120, 122) appearing in respective subrate traffic channels (A, B, C) of said fullrate channel arriving at the demultiplexer or to pass them (124) substantially unaffected through the respective voice channel means and at least one channel output (80, 82, 84) connected to a respective voice channel means, characterised in that the switch control means is arranged to dynamically allocate the subrate traffic channels in said fullrate channel as subrate voice channels and subrate data channels in dependence of demand.

13. Private branch exchange (20) according to claim 12, wherein the fullrate channel comprises a subrate information channel (D) and the channel handling device (94) comprises a control means (72) connected to the switch control means and to the first demultiplexer (78), where the control means is arranged to forward signalling information (126) received in a subrate information channel (D) in the fullrate channel to the switch control means.

14. Private branch exchange according to claim 13, wherein the control means is arranged to, in dependence of control information received from the switch control means, individually control each voice channel means to receive no signals or signals from at least one subrate traffic channel and to either pass the signals, received by the demultiplexer in the at least one subrate traffic channel, essentially unaffected through the voice channel means to the respective channel output possibly together with filler bits added to each signal in order to adapt the format of the signal to a format suitable for switching in the exchange, or either to decompress the signals from the one subrate traffic channel and to supply these decompressed signals to the respective channel output.

15. Private branch exchange (10) for communication with other private branch exchanges (20) using dynamic allocation of subrate traffic channels in a fullrate channel (118) in dependence of demand, where a subrate traffic channel can be a subrate voice channel (A, B) containing compressed voice or a subrate data channel (C), characterised by a switch control means (42) for setting up at least one fullrate channel (118) leaving said private branch exchange (10) on a first telecommunication line (14), which fullrate channel is arranged for connection to said other private branch exchange (20), where the transmission format of the first telecommunication line is divided into frames containing a number of time slots (TS1, TS2, Tsn, TS-32) and the fullrate channel occupies a certain time slot (Tsn), at least one voice channel means (66, 68, 70) arranged to compress incoming signals (100, 102) to signals (110, 112) intended for at least one first subrate traffic channel (A, B) or to pass at least part of each incoming signal (104) unaffected through to said first subrate traffic channel (C), a first multiplexer (76) connected to each voice channel means and arranged to multiplex signals (100, 108, 110, 112) incoming to the multiplexer to outgoing signals in at least two subrate channels (A, B, C, D) provided in the first fullrate channel (118), and a local control means (72) connected to the switch control means (42) and to the multiplexer (76), where the local control means is arranged to forward signalling information (106) received from the switch control means to the multiplexer in a subrate information channel (D).

16. Private branch exchange (20) for communication with other private branch exchanges (10) using dynamic allocation of subrate traffic channels in a fullrate channel (118) in dependence of demand, where a subrate traffic channel can be a subrate voice channel (A, B) containing compressed voice or a subrate data channel (C), characterised by a switch control means for setting up at least one fullrate channel (118) arriving at said private branch exchange on at least one first telecommunication line (14), which is connecting said private branch exchange (20) with another private branch exchange, where the transmission format of the first telecommunication line is divided into frames containing a number of time slots (TS1, TS2, Tsn, TS-32) and the fullrate channel occupies a certain time slot (TSn), a first demultiplexer (78) for receiving signals sent in subrate channels (A, B, C, D) of a first fullrate channel (118) from the first other exchange and being arranged to demultiplex signals from at least two subrate channels (A, B, C, D) into at least two separate streams, where all channels, except one subrate information channel (D), are subrate traffic channels, one voice channel means (66, 68, 70) for every subrate traffic channel of the first fullrate channel, where every voice channel means is connected to the demultiplexer and is arranged to either decompress signals (120, 122) appearing in respective subrate traffic channels (A, B, C) of said fullrate channel arriving at the demultiplexer or to pass them (124) substantially unaffected through the respective voice channel means and a local control means (72) connected to the switch control means and to the first demultiplexer (78), where the local control means is arranged to forward signalling information (126) received in the subrate information channel (D) to the switch control means.

17. Telecommunication system comprising at least a first and a second private branch exchange (10, 20, 30) connected to each other via at least one first telecommunication line (14), which has a transmission format that is divided into frames containing a number of time slots (TS1, TS2, Tsn, TS-32), where each exchange comprises a switch control means (42) for setting up at least one fullrate channel (118) in a certain time slot (TSn) on the first telecommunication line (14), where at least the first exchange (10) comprises a first channel handling device (44) comprising at least one channel input (22, 24, 26) for receiving signals to be output in said fullrate channel, at least one sending voice channel means (66, 68, 70) connected to a respective channel input and being arranged to compress signals (100, 102) appearing on this respective channel input (22, 24) to signals (110, 112) intended for at least one first subrate traffic channel (A, B) or to pass at least part of each signal (104) appearing on this channel input unaffected through the sending voice channel means to said subrate traffic channel (C), where a subrate traffic channel can be a subrate voice channel (A, B) or a subrate data channel (C), and a first multiplexer (76) connected to each sending voice channel means and arranged to multiplex signals (100, 108, 110, 112) incoming to the multiplexer to outgoing signals in at least two subrate channels (A, B, C, D) provided in the first fullrate channel (118), where at least the second exchange (20) comprises a second channel handling device (94) comprising a first demultiplexer (78) for receiving the signals sent in the subrate channels (A, B, C, D) of the first fullrate channel (118) from the first exchange and being arranged to demultiplex the signals from these subrate channels (A, B, C, D), into separate streams, where these subrate channels comprise the subrate traffic channels sent from the sending voice channel means plus a possible subrate information channel (D), one receiving voice channel means (66, 68, 70) for every subrate channel of the first fullrate channel except for the possible subrate information channel, where every receiving voice channel means is connected to the demultiplexer and is arranged to either decompress signals (120, 122) appearing in respective subrate channels (A, B, C) of said fullrate channel arriving at the demultiplexer or to pass them (124) substantially unaffected through the respective voice channel means and at least one channel output (80, 82, 84) connected to a respective receiving voice channel means, characterised in that the switch control means (42) of both the exchanges (10, 20) are arranged to dynamically allocate the subrate traffic channels in said fullrate channel as subrate voice channels and subrate data channels in dependence of demand.

18. Telecommunication system according to claim 17, wherein the first channel handling device (44) comprises a sending control means (72) connected to the switch control means (42) of the first exchange and to the multiplexer (76), where the sending control means (72) is arranged to forward signalling information (106) received from the switch control means to the multiplexer in a subrate information channel (D) and the second channel handling device comprises a receiving control means (72) connected to the switch control means of the second exchange and to the demultiplexer (78), which receiving control means (72) is arranged to forward signalling information (126) received in the subrate information channel (D) in the fullrate channel to said switch control means.

19. Method of sending signals in a number of subrate channels of at least one fullrate channel (118) from a first private branch exchange (10) to a second private branch exchange (20) over at least one first telecommunication line (14), which has a transmission format that is divided into frames containing a number of time slots (TS1, TS2, Tsn, TS-32) and the fullrate channel occupies a certain time slot (TSn), comprising the steps of:

dynamically allocating subrate traffic channels (A, B, C) for use as subrate voice channels (A, B) and subrate data channels (C) in dependence of demand, receiving at least one first stream of signals (100, 102, 104) to be output in one subrate voice channel (A, B) or in at least one subrate data channel (C) in said fullrate channel, processing each first stream according to a first or a second processing step in dependence of the allocation performed, multiplexing each processed first stream into at least one corresponding subrate channel of the first fullrate channel and sending the multiplexed streams in the fullrate channel (118) from the first to the second exchange, wherein the first processing step comprises compressing each signal (100, 102) in the first stream for output to a subrate voice channel and the second processing step comprises passing at least part of each signal (104) of the first stream unaffected to a multiplexer (76) for output to at least one subrate traffic channel.

20. Method according to claim 19, wherein the step of receiving also comprises receiving signalling information from a switch control means (42) in the first exchange and the step of multiplexing also comprises multiplexing the first stream together with a second stream of signalling information (106) into a subrate information channel (D), where the signalling information comprises information concerning subrate channels used for communication with the second private branch exchange.

21. Method according to claim 19, comprising the further steps of receiving at least one further stream of signals to be output in at least two subrate channels in a second fullrate channel, processing each further stream according to the first or the second processing step in dependence of the allocation performed, multiplexing each processed further stream into at least one corresponding subrate channel in the second fullrate channel and sending the multiplexed streams in the second fullrate channel to the second private branch exchange.

22. Method of receiving, in a second private branch exchange (20), signals transmitted in a number of subrate channels in at least one fullrate channel (118) sent from a first private branch exchange (10) to the second private branch exchange over at least one first telecommunication line (14), which has a transmission format that is divided into frames containing a number of time slots (TS1, TS2, Tsn, TS-32) and the fullrate channel occupies a certain time slot (TSn), comprising the steps of:

dynamically allocating subrate traffic channels (A, B, C) for use as subrate voice channels (A, B) and subrate data channels (C) in dependence of demand, receiving, in a demultiplexer (78), signals sent in at least two subrate channels (A, B, C, D) of a first fullrate channel (118) from the first exchange, demultiplexing the signals from all subrate channels (A, B, C, D) into separate streams (120, 122, 124, 126), where each stream, perhaps with the exception of a first stream, comes either from a respective subrate voice channel (A, B) or at least one respective subrate data channel (C), and processing each stream, with the exception of said first stream, according to a first or a second processing step in dependence of the allocation performed, wherein the first processing step comprises decompressing signals (120, 122) in said stream coming from one subrate voice channel (A, B) and supplying these decompressed signals (128, 130) in said stream to a respective channel output (80, 82) and the second processing step comprises passing signals (124) in said stream coming from at least one subrate traffic channel essentially unaffected to a respective channel output means while possibly adding filler bits to each such signal (124).

23. Method according to claim 22, wherein the step of demultiplexing comprises demultiplexing signals into a first stream comprising signalling information (126) coming from one of the subrate channels which is a subrate information channel (D), which signalling information comprises information concerning subrate channels used for communication between the first and second exchange, and comprising the further step of supplying signals in the first stream to a switch control means of the second exchange.

24. Private branch exchange for communication with other private branch exchanges using compressed voice channels and data channels and comprising:

a switch control means for setting up at least one fullrate channel leaving said private branch exchange on a first telecommunication line, which fullrate channel is arranged for connection to said other private branch exchange, where the transmission format of the first telecommunication line is divided into frames containing a number of time slots and the fullrate channel occupies a certain time slot; and at least one channel handling device comprising:

at least one channel input for receiving signals to be output in said fullrate channel;

at least one voice channel means connected to a respective channel input and being arranged to compress signals appearing on this respective channel input to signals intended for at least one first subrate traffic channel or to pass at least part of each signal appearing on this channel input unaffected through the voice channel means to said first subrate traffic channel, where a subrate traffic channel can be a subrate voice channel or a subrate data channel; and a first multiplexer connected to each voice channel means and arranged to multiplex signals incoming to the multiplexer to outgoing signals in at least two subrate channels provided in the first fullrate channel;

wherein the switch control means is arranged to dynamically allocate the subrate traffic channels in the fullrate channel to compressed voice and data in dependence of demand.

25. Private branch exchange for communication with other private branch exchanges using compressed voice channels and data channels and comprising:

a switch control means for setting up at least one fullrate channel arriving at said private branch exchange on at least one first telecommunication line, which is connecting said private branch exchange with another private branch exchange, where the transmission format of the first telecommunication line is divided into frames containing a number of time slots and the fullrate channel occupies a certain time slot; and at least one channel handling device comprising:

a first demultiplexer for receiving signals sent in subrate channels of a first fullrate channel from the first other exchange and being arranged to demultiplex signals from at least two subrate channels into at least two separate streams, where all channels, perhaps with the exception of one subrate information channel, are subrate traffic channels in the form of subrate voice channels or subrate data channels or a combination of both subrate voice and subrate data channels;

one voice channel means for every subrate traffic channel of the first fullrate channel, where every voice channel means is connected to the demultiplexer and is arranged to either decompress signals appearing in respective subrate traffic channels of said fullrate channel arriving at the demultiplexer or to pass them substantially unaffected through the respective voice channel means; and at least one channel output connected to a respective voice channel means;

wherein the switch control means is arranged to dynamically allocate the subrate traffic channels in said fullrate channel as subrate voice channels and subrate data channels in dependence of demand.

26. Private branch exchange for communication with other private branch exchanges using dynamic allocation of subrate traffic channels in a fullrate channel in dependence of demand, where a subrate traffic channel can be a subrate voice channel containing compressed voice or a subrate data channel, comprising:

a switch control means for setting up at least one fullrate channel leaving said private branch exchange on a first telecommunication line, which fullrate channel is arranged for connection to said other private branch exchange, where the transmission format of the first telecommunication line is divided into frames containing a number of time slots and the fullrate channel occupies a certain time slot;

at least one voice channel means being arranged to compress incoming signals to signals intended for at least one first subrate traffic channel or to pass at least part of each incoming signal unaffected through to said first subrate traffic channel;

a first multiplexer connected to each voice channel means and arranged to multiplex signals incoming to the multiplexer to outgoing signals in at least two subrate channels provided in the first fullrate channel; and a local control means connected to the switch control means and to the multiplexer, where the local control means is arranged to forward signalling information received from the switch control means to the multiplexer in a subrate information channel.

27. Private branch exchange for communication with other private branch exchanges using dynamic allocation of subrate traffic channels in a fullrate channel (118) in dependence of demand, where a subrate traffic channel can be a subrate voice channel containing compressed voice or a subrate data channel, comprising:

a switch control means for setting up at least one fullrate channel arriving at said private branch exchange on at least one first telecommunication line, which is connecting said private branch exchange with another private branch exchange, where the transmission format of the first telecommunication line is divided into frames containing a number of time slots and the fullrate channel occupies a certain time slot;

a first demultiplexer for receiving signals sent in subrate channels of a first fullrate channel from the first other exchange and being arranged to demultiplex signals from at least two subrate channels into at least two separate streams, where all channels, except one subrate information channel, are subrate traffic channels;

one voice channel means for every subrate traffic channel of the first fullrate channel, where every voice channel means is connected to the demultiplexer and is arranged to either decompress signals appearing in respective subrate traffic channels of said fullrate channel arriving at the demultiplexer or to pass them substantially unaffected through the respective voice channel means; and a local control means connected to the switch control means and to the first demultiplexer, where the local control means is arranged to forward signalling information received in the subrate information channel to the switch control means.

28. Telecommunication system comprising at least a first and a second private branch exchange connected to each other via at least one first telecommunication line, which has a transmission format that is divided into frames containing a number of time slots, where each exchange comprises a switch control means for setting up at least one fullrate channel in a certain time slot on the first telecommunication line;

where at least the first exchange comprises a first channel handling device comprising:

at least one channel input for receiving signals to be output in said fullrate channel;

at least one sending voice channel means connected to a respective channel input and being arranged to compress signals appearing on this respective channel input to signals intended for at least one first subrate traffic channel or to pass at least part of each signal appearing on this channel input unaffected through the sending voice channel means to said subrate traffic channel, where a subrate traffic channel can be a subrate voice channel or a subrate data channel; and a first multiplexer connected to each sending voice channel means and arranged to multiplex signals incoming to the multiplexer to outgoing signals in at least two subrate channels provided in the first fullrate channel;

where at least the second exchange comprises a second channel handling device comprising:

a first demultiplexer for receiving the signals sent in the subrate channels of the first fullrate channel from the first exchange and being arranged to demultiplex the signals from these subrate channels into separate streams, where these subrate channels comprise the subrate traffic channels sent from the sending voice channel means plus a possible subrate information channel;

one receiving voice channel means for every subrate channel of the first fullrate channel except for the possible subrate information channel, where every receiving voice channel means is connected to the demultiplexer and is arranged to either decompress signals appearing in respective subrate channels of said fullrate channel arriving at the demultiplexer or to pass them substantially unaffected through the respective voice channel means; and at least one channel output connected to a respective receiving voice channel means;

wherein the switch control means of both the exchanges are arranged to dynamically allocate the subrate traffic channels in said fullrate channel as subrate voice channels and subrate data channels in dependence of demand.

29. Method of sending signals in a number of subrate channels of at least one fullrate channel from a first private branch exchange to a second private branch exchange over at least one first telecommunication line, which has a transmission format that is divided into frames containing a number of time slots and the fullrate channel occupies a certain time slot, comprising the steps of:

dynamically allocating subrate traffic channels for use as subrate voice channels and subrate data channels in dependence of demand;

receiving at least one first stream of signals to be output in one subrate voice channel or in at least one subrate data channel in said fullrate channel;

processing each first stream according to a first or a second processing step in dependence of the allocation performed; and multiplexing each processed first stream into at least one corresponding subrate channel of the first fullrate channel and sending the multiplexed streams in the fullrate channel from the first to the second exchange;

wherein the first processing step comprises compressing each signal in the first stream for output to a subrate voice channel and the second processing step comprises passing at least part of each signal of the first stream unaffected to a multiplexer for output to at least one subrate traffic channel.

30. Method of receiving, in a second private branch exchange, signals transmitted in a number of subrate channels in at least one fullrate channel sent from a first private branch exchange to the second private branch exchange over at least one first telecommunication line, which has a transmission format that is divided into frames containing a number of time slots and the fullrate channel occupies a certain time slot, comprising the steps of:

dynamically allocating subrate traffic channels for use as subrate voice channels and subrate data channels in dependence of demand;

receiving, in a demultiplexer, signals sent in at least two subrate channels, of a first fullrate channel, from the first exchange;

demultiplexing the signals from all subrate channels into separate streams, where each stream, perhaps with the exception of a first stream, comes either from a respective subrate voice channel or at least one respective subrate data channel; and processing each stream, with the exception of said first stream, according to a first or a second processing step in dependence of the allocation performed;

wherein the first processing step comprises decompressing signals in said stream coming from one subrate voice channel and supplying these decompressed signals in said stream to a respective channel output and the second processing step comprises passing signals in said stream coming from at least one subrate traffic channel essentially unaffected to a respective channel output means while possibly adding filler bits to each such signal.

* * * * *